United States Patent [19]

Clark

[11] Patent Number: 4,570,554
[45] Date of Patent: Feb. 18, 1986

[54] ADJUSTABLE WIDTH CLOSING WHEELS FOR PLANTER ROW UNITS

[75] Inventor: Richard H. Clark, Blue Grass, Iowa
[73] Assignee: Deere & Company, Moline, Ill.
[21] Appl. No.: 546,690
[22] Filed: Oct. 28, 1983
[51] Int. Cl.⁴ ............................................. A01C 5/06
[52] U.S. Cl. ..................................................... 111/85
[58] Field of Search ............. 384/495, 520, 519, 583, 384/616, 460 B, 489, 486, 157, 153; 111/85, 86, 87, 88, 34; 172/538, 599

[56] References Cited

U.S. PATENT DOCUMENTS

| | | | |
|---|---|---|---|
| 791,018 | 5/1905 | Faust | 384/157 |
| 1,631,557 | 6/1927 | Sponable | 384/583 |
| 1,832,312 | 11/1931 | Lutz | 384/616 |
| 2,783,103 | 2/1957 | Hamilton | 384/486 X |
| 3,000,675 | 9/1961 | Larkin | 384/489 X |
| 3,330,563 | 7/1967 | De Puydt et al. | 384/153 X |
| 3,438,639 | 4/1969 | Paulsen | 384/486 X |
| 3,538,971 | 11/1970 | Stewart | 111/85 |
| 4,009,668 | 3/1977 | Brass et al. | 111/85 |
| 4,136,746 | 1/1979 | Tusing | 384/157 X |
| 4,141,302 | 2/1979 | Morrison, Jr. et al. | 111/85 |
| 4,404,918 | 9/1983 | Whalen et al. | 111/85 |

FOREIGN PATENT DOCUMENTS 46502  8/1918  Fed. Rep. of Germany ...... 384/157

Primary Examiner—Robert A. Hafer
Assistant Examiner—Danton D. DeMille
Attorney, Agent, or Firm—Henderson & Sturm

[57] ABSTRACT

An improved furrow closing mechanism for a seed planting apparatus including an apparatus for adjusting the distance between furrow closing wheels to correspond to adjustments in the size of the furrow being formed. The wheels are mounted on an axle assembly and this axle assembly includes an axle shaft having reduced first and second portions on each end thereof. A bearing is disposed on the outermost reduced section of each end of the axle shaft and a seal is disposed on an inner adjacent reduced section of each of the ends of such axle shaft. Adjustments to the distance between the soil contacting portions of the closing wheels are made by utilizing spacers corresponding to the distance for which it is desired to space the wheels outwardly from the position they would be in if no spacers were used.

3 Claims, 6 Drawing Figures

4,570,554

ADJUSTABLE WIDTH CLOSING WHEELS FOR PLANTER ROW UNITS

TECHNICAL FIELD

The present invention relates generally to agricultural seed planters, and more particularly to an improvement to such planters for selectively adjusting the spacing between closing wheels on a furrow closing mechanism for such planters.

BACKGROUND ART

U.S. Pat. No. 4,009,668 to Brass et al shows a planting apparatus which has had considerable commercial success. In general, planters of this type have a furrow forming mechanism, a mechanism for depositing seeds at spaced intervals in such furrow and a furrow closing mechanism whereby the seeds are covered by soil and are thereby ready to grow.

A wide variety of seed furrow closing systems are used on planter row units. The primary function of such systems is to cover the planted seed with soil and provide good seed-to-soil contact for optimum seed germination. With a minimum amount of adjustment, they are required to work in a wide range of soil conditions. They must also work well at different planting depths.

In light or moist soil, or planting shallow, a narrow closing system, one with the soil moving components close to the centerline of the row, would function better than a wider one. A narrow system would move less soil toward the seed, thereby better maintaining the intended seed depth by not moving excessive amounts of soil on top of the seed. Also, a system that moves less soil has a much smaller chance of moving the seed from its intended position.

In the aforementioned commercial embodiment of the Brass et al patent, provision was made for adjusting the depth of the furrow made in the soil. When the depth of the furrow is increased, because it is a V-shaped furrow, the top of the furrow will become wider. Conversely, if the furrow is made shallower, the distance across the top of the furrow will decrease. However, in such commercial embodiment of the Brass et al patent, no provision was made for adjusting the distance between the furrow closing wheels. Ideally, the distance between the furrow closing wheels where they contact the soil adjacent each side of the top of the furrow should be adjusted depending upon the actual width of the top of the furrow. But heretofore there has been no solution to such problems. Consequently, there exists a need for an apparatus to solve such problems.

DISCLOSURE OF THE INVENTION

The present invention relates to an improved furrow closing mechanism for a seed planting apparatus, and specifically to an apparatus for adjusting the distance between furrow closing wheels to oorrespond to adjustment in the size of the furrow being formed and to correspond to soil operations such as texture and moisture. The wheels are mounted on an axle assembly and this axle assembly includes an axle shaft having reduced first and second portions on each end thereof. A bearing is disposed on the outermost reduced section of each end of the axle shaft and a seal is disposed on an inner adjacent reduced section of each of the ends of such axle shaft. Adjustments to the distance between the soil contacting portions of the closing wheels are made by utilizing spacers corresponding to the distance for which it is desired to space the wheels outwardly from the position they would be in if no spacers were used. A first spacer has an inner diameter corresponding to the inner diameter of the section of the axle having the bearings disposed thereon, and an outer diameter corresponding substantially to the diameter of the seal itself. While these first and second spacers may be of different lengths, depending upon the spacing desired, the lengths must be matched together to be of the same matching length for any one spacing application thereof.

An object of the present invention is to provide an improved furrow closing mechanism for an agricultural planter.

Another object of the invention is to provide a mechanism of the aforementioned type for adjusting the distance between a pair of furrow closing wheels.

Still another object of the present invention is to provide an adjusting mechanism for adjusting the width between furrow closing wheels which is economical to construct, simple to install and dependable to use.

Other objects, advantages and novel features of the present invention will become apparent from the following detailed description of the invention when considered in conjunction with the accompanying drawings.

BEST MODE FOR CARRYING OUT THE INVENTION

Figure 1:
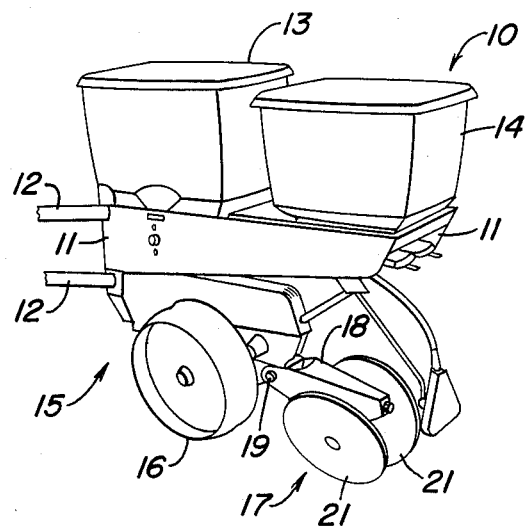
FIG. 1 shows a perspective view of a planter unit constructed in accordance with the present invention.

Referring now to the drawings wherein like reference numerals designate identical or corresponding parts throughout the several views, FIG. 1 shows a seed planting unit (10) constructed in accordance with the present invention. This planting unit (10) is substantially identical to the planter unit shown in U.S. Pat. No. 4,009,668 to Brass et al (which patent is incorporated herein by reference) except for the construction of the furrow closing mechanism (17). For example, the planter unit (10) has a subframe (11) with parallel links (12) leading to a main frame (not shown). On the subframe (11) are attached a seed hopper (13), a chemical dispensing hopper (14), a furrow opening mechanism (15), a gauge wheel mechanism (16), in addition to the improved furrow closing mechanism (17) which will be explained in more detail below.

Referring now more specifically to the furrow closing mechanism (17) of the present invention, it is noted that a furrow closing arm (18) is pivotally attached along the horizontal axis to the subframe (11) by a pin structure (19) which extends to the subframe (11) and through the furrow closing arm (18).

Furrow closing wheels (21) are rotatably mounted to a unitary axle shaft (22) having a central portion (23) and first and second outwardly extending portions (24) leading to a free end (25) which is threaded for reception of nuts (26). A groove (20) in one side of the axle shaft (22) is used to identify the left from the right side thereof, for fabricating purposes.

Each of the first and second portions (24) of the axle shaft (22) has a first reduced portion (27) thereon for receiving bearings (28) thereon for the conventional purpose of minimizing the amount of friction during the rotation of the furrow closing wheels (21). A second reduced portion (29) of a slightly larger diameter than the reduced portion (27) is for the purpose of permitting a seal (30) to be mounted thereon for preventing dirt and other contaminants from entering the bearings (28). A still further seal (31) is merely a plastic cap which extends over the nut (26) and keeps dirt and other contaminants from entering the other side of the bearings (28).

A first shoulder (32) separates the first reduced section (27) from the second reduced section (29), and a second shoulder (33) defines the other end of the second reduced shoulder (29). A washer or spacer (34) may be disposed between the nut (26) and bearings (28) if so desired. It should also be noted that the arm (18) is welded to the axle shaft (22), although it could of course be fastened in other ways if so desired.

Figure 2:
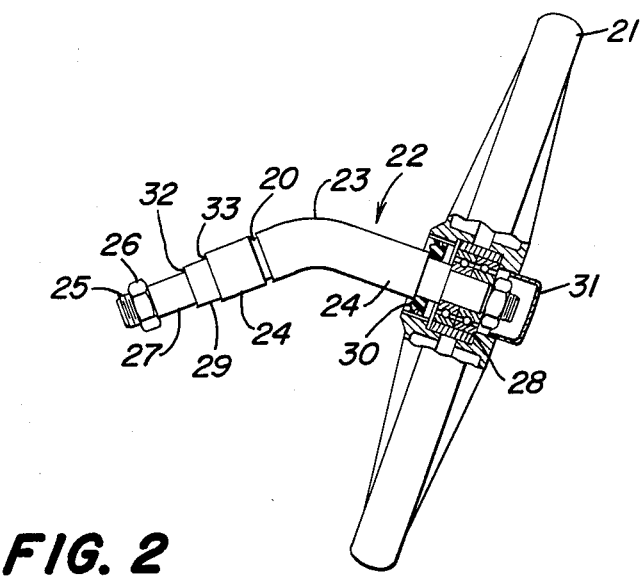
FIG. 2 shows an enlarged side elevational view of an axle assembly for mounting furrow closing wheels thereon for the planter unit shown in FIG. 1 and having one of the furrow closing wheels attached thereto and the other removed for illustrative purposes.
Figure 3:
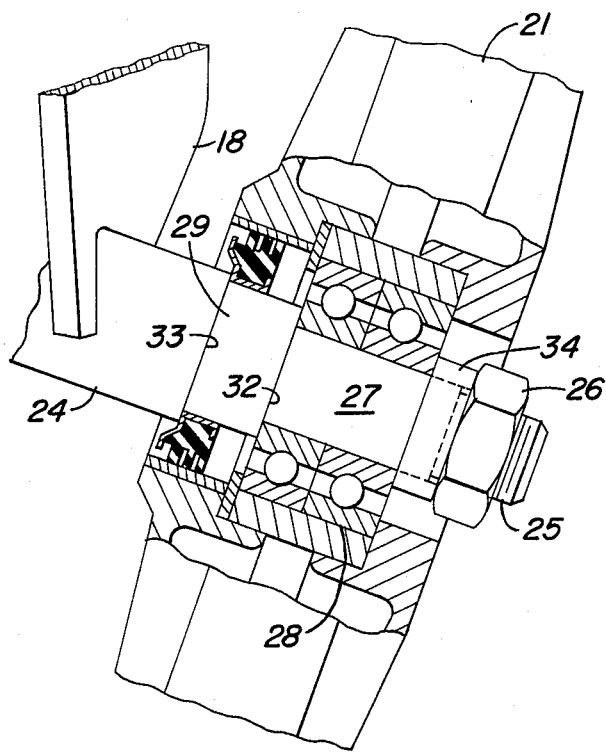
FIG. 3 shows an even further enlarged view of one end of such axle assembly having a closing wheel attached thereto, showing in detail the relative position of the shaft, wheel, bearings and seals.
Figure 4:
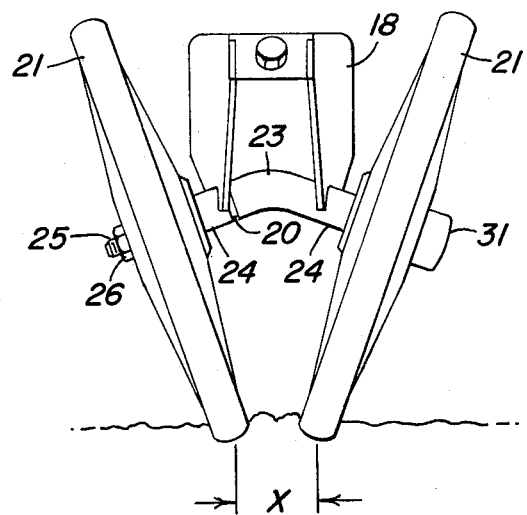
FIG. 4 is a rear view of the furrow closing mechanism of FIGS. 2 and 3 showing the closing wheels spaced apart by a distance "x"

Referring now to FIG. 4, it is noted that when the closing wheels (21) are mounted to the axle shaft (22) in the manner shown in FIGS. 2 and 3, the bottom of the closing wheel will be spaced apart a distance "x". However, when it is desired to space the closing wheels (21) apart by the distance "y" shown in FIG. 6, then a spacer (36) and a second spacer (37) are added to the assembly shown in FIGS. 2 and 3 in the position shown in detail in FIG. 5. The spacer (36) has an inside diameter of the same diameter as the first reduced portion (27) and an outer diameter the same as the second reduced diameter section (29).

The second spacer (37) has an inner diameter approximately the same as the outer diameter of the reduced section (29) so that the spacer (37) can be telescopically received thereon. The spacer (37) has an outer diameter substantially the same as the major portion of the axle shaft (22), but it will be understood to those skilled in this art that the outer diameter of spacer (37) can be of other sizes, just so it does not interfere with the proper positioning of the seal (30) or any other part of the closing wheel (21).

Figure 5:
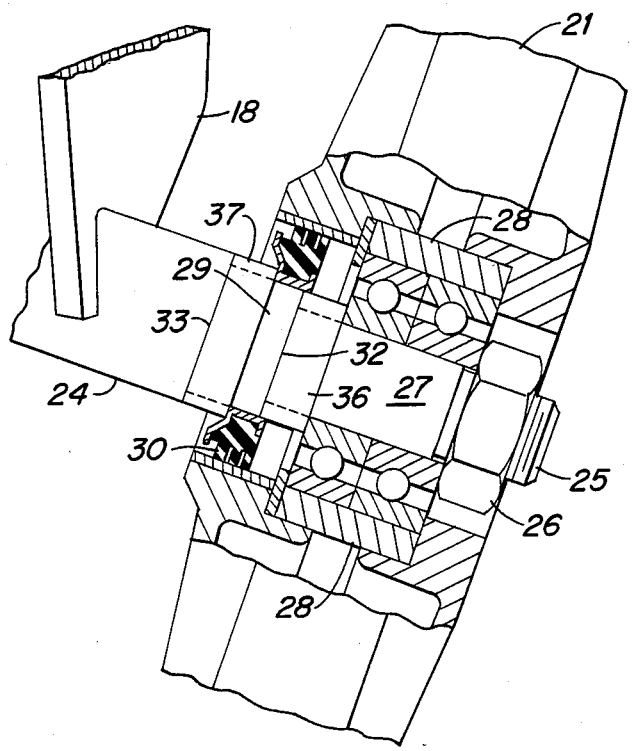
FIG. 5 shows an enlarged cross-sectional view similar to FIG. 3, but showing the closing wheels spaced outwardly from the position shown in FIGS. 2-4.
Figure 6:
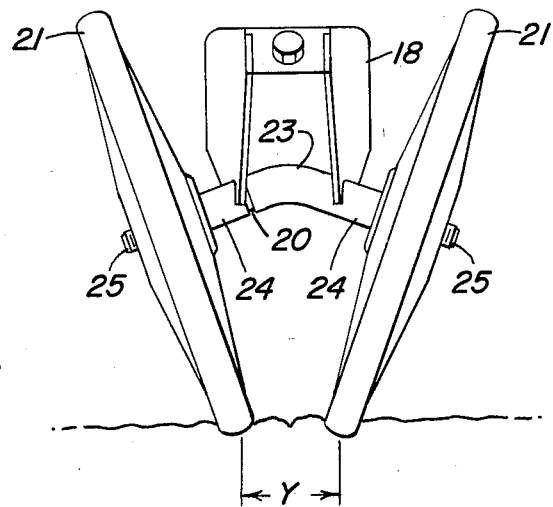
FIG. 6 is a view like FIG. 4, but showing the closing wheels spaced apart a distance "y" corresponding to a structure used for spacing the wheels apart further as shown in FIG. 5.

The spacer (34), shown in FIG. 3, has approximately the same length as the length of spacers (36) and (37) and is typically removed when the spacers (36) and (37) are utilized, for example as shown in FIG. 5, so that the nut (26) is disposed on approximately the same part of threaded portion (25) of the axle shaft (22) when tightened down in place in all applications thereof. Of course, the present invention is not limited to the use or non-use of the spacer or washer (34).

The first spacer (36) and the second spacer (37) are matched in length such that the bearings (28) are spaced from the shoulder (32) by exactly the same distance that the washer (34) is spaced from the shoulder (33), for the reason that the bearings (28), seals (30) and the corresponding portion of the interfitting axle shaft (22) were designed to have such relative spacing with respect to each other. It will be clearly understood to those skilled in this art that the length of spacers (36) and (37) can be adjusted, but during the adjustment thereof they must remain matched so that the length of the spacers (36) and (37) are always the same, i.e. if the length of (36) is lengthened by a certain amount, then the corresponding spacer (37) to be used with a spacer (36) must also be lengthened by the same certain amount. In the preferred embodiment thereof, both of the closing wheels (21) will be attached either with matching spacers (36) and (37) or without any spacers (36) and (37).

Accordingly, it will be appreciated that the aforementioned objects have been achieved by use of the structure shown in FIGS. 1-6. Obviously, many modifications and variations of the present invention are possible in light of the above teachings. It is therefore to be understood that, within the scope of the appended claims, the invention may be practiced otherwise than as specifically described.

I claim:

1. In a seed planting implement of a type including a frame adapted to be moved along the ground and having at least one seed planting unit connected to said frame, said seed planting unit including a subframe, means for forming a furrow in the soil attached to said subframe, means for depositing seeds into said furrow, furrow closing means attached to said subframe rearwardly of said seed depositing means for causing the soil on each side of said furrow to be pushed over the seeds in the furrow, said furrow closing means including an arm pivotally attached at one end thereof to said subframe along an axis substantially transverse to the direction of forward movement of said planting implement in operation, a first and second rotatable closing wheel means for engaging each side of said furrow for pushing the soil forming each side of the furrow over the seeds in the furrow, axle assembly means attached to the other end of said arm for rotatably attaching said first and second closing wheel means to said arm, the improvement comprising:

said axle assembly means including an axle shaft, said axle shaft having a central portion, a first portion extending from said central portion along a first closing wheel means axis to a free end thereof, and a second portion extending from said central portion along a second closing wheel means axis to a free end thereof;

a first reduced section on the free end of said first portion of said axle shaft;

bearing means disposed on said first reduced section for reducing friction during rotation of said first closing wheel means;

a second reduced section on another part of the free end of said first portion of said axle shaft, a first shoulder on the first portion of said axle shaft separating the first reduced section from the second reduced section and a second shoulder separating the second reduced section from the remainder of said first portion of the axle shaft;

first spacing means for selectively spacing said bearing means a predetermined distance from said first shoulder;

seal means disposed on said second reduced section for sealing contaminants from said bearing means;

second spacing means for selectively spacing said seal means by a predetermined distance from said second shoulder whereby said first wheel means can selectively be spaced outwardly or inwardly by use or non-use of said first and second spacing means;

a first reduced section on the free end of said second portion of said axle shaft;

second bearing means disposed on said first reduced section of said second portion for reducing friction during rotation of said second closing wheel means;

second reduced section on another part of the free end of said second portion of said axle shaft, a first shoulder on the second portion of said axle shaft separating the first reduced section from the second reduced section of the second portion and a second shoulder separating the second reduced section from the remainder of said second portion of the axle shaft;

third spacing means for selectively spacing said second bearing means by said predetermined distance from the first shoulder of said second portion;

second seal means disposed on said second reduced section of said second portion of the axle shaft for sealing contaminants from said second bearing means; and fourth spacing means tor selectively spacing said second seal means by a predetermined distance from said second shoulder on said second portion of the axle shaft, whereby said second closing wheel means can selectively be spaced outwardly or inwardly by use or non-use of said third and fourth spacing means.

2. The apparatus of claim 1 wherein said first spacing means has an outside diameter equal to the diameter of said second reduced section of said first portion.

3. The apparatus of claim 1 wherein said third spacing means has an outside diameter equal to the diameter of said second reduced section of said second position.

* * * * *